United States Patent Office 3,311,465
Patented Mar. 28, 1967

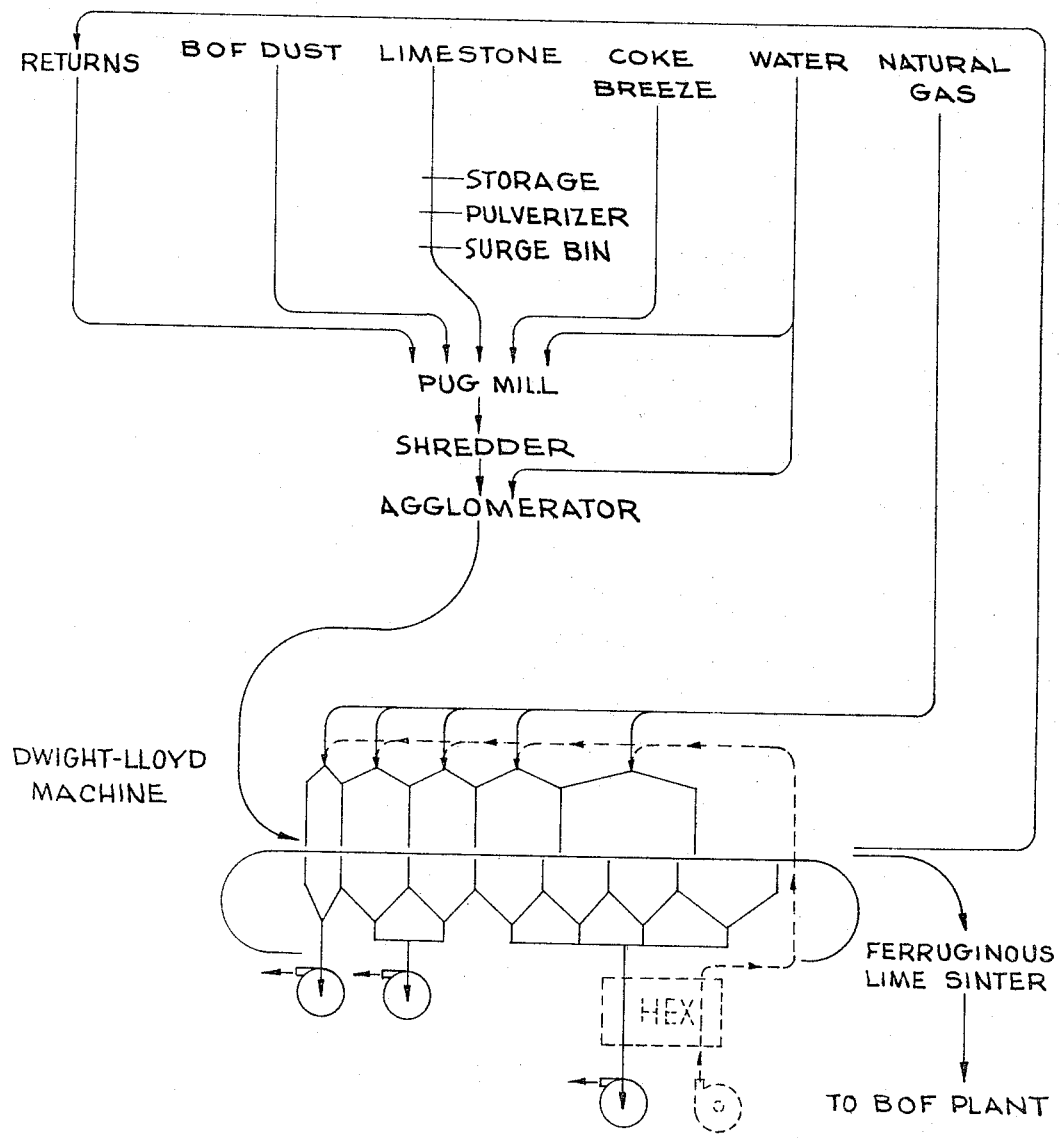

3,311,465
IRON-CONTAINING FLUX MATERIAL FOR
STEEL MAKING PROCESS
Thomas E. Ban, Cleveland Heights, Charles D. Thompson, South Euclid, and Carl J. Nelson, Lakewood, Ohio, assignors to McDowell-Wellman Engineering Company, a corporation of Ohio
Filed Feb. 6, 1964, Ser. No. 343,006
8 Claims. (Cl. 75—5)

This invention relates, as indicated, to an improved flux material for use in steel making processes for example, the basic oxygen furnace, the open hearth, or the like; and more especially to a flux material which contains iron values which have been reclaimed from steel-making processes such as, the open hearth, and the basic oxygen furnace.

More especially, the invention relates to an improved process in which waste materials containing iron values are obtained from steel-making operations and combined with limestone to produce a ferruginous lime material as the final product in a form of which is suitable for return to the steel-making operations as a flux material.

In the manufacture of steel, substantial quantities of fume are ordinarily evolved and the principal constituent of such fume is ferric oxide in extremely small particulate form. If such fume is released to the atmosphere, it creates a troublesome atmospheric pollution problem. In order to preclude such pollution problems, it is customary to operate fume abatement devices in connection with steel-making operations.

Conventional fume abatement devices of the type commonly employed in such operations includes electrostatic precipitators, dry scrubbers and wet scrubbers. The solid material which is collected in such devices is primarily ferric oxide, $Fe_2O_3$, in the form of small particles which are usually less than 5 microns in diameter and often less than about 1 micron in diameter. While this recovered material is valuable because of its ferric oxide content, it is not possible to recycle it to the steel-making operation because its finely divided form would cause it to be blown out of the apparatus, and this would only overload the fume abatement devices. It is, therefore, desirable to provide a means by which this waste material recovered in a fume abutment system may be converted from a mass of finely divided particles to a form which is suitable for reuse in steel-making operations.

One of the necessary ingredients in the manufacture of steel is a basic oxide, particularly lime, which serves as a flux in removing certain undesirable ingredients from pig iron. Lime forms a slag with materials such as phosphorus and silica which are normally present in pig iron and which must be removed in order to convert the pig iron into steel. In some steel-making processes, such as the open hearth process, it is customary to add limestone to the charge, but it is necessary to convert it to lime before it can serve its function as a fluxing agent. In other processes, such as the so-called basic oxygen process, it is customary to charge the apparatus with lime rather than limestone. It is, therefore, desirable to provide a process in which limestone is converted into lime, and thereafter chemically combine the lime with the waste material containing ferric oxide whereby the waste material is coverted to a form suitable for reuse in the steel-making operation, and recovery of the iron values.

It has now been found that by sinering an agglomerate admixture of limestone and iron oxide which also includes from about 10% to about 20% by weight of a carbonaceous fuel material, such as coke breeze, anthracite coal, bituminous coal, coke, graphite, or the like, and there can be produced more efficiently than heretofore possible, a flux material containing lime and calcium ferrites suitable for use as a flux in steel-making processes. The inclusion of the fuel material with the pre-sintered agglomerates confers several important advantages upon the process of making ferruginous lime fluxing material. It has been found that the capacity of the traveling grate sintering machine may be increased substantially by up to four tons per square foot per day. The presence of the fuel material also aids in the removal of deleterious elements from the iron oxide fume raw material, such deleterious elements including zinc, phosphorus and sulphur. It has also been found that there can be a decrease in the amount of heat required to effect the chemical conversion of the iron oxide to calcium ferrites. Generally, the heat requirements of the fuel-containing compositions in comparison with the fuel-less compositions is in the range of from about 15% to about 30% less.

The present invention may be better understood by having reference to the annexed flow sheet which diagrams the raw materials and the unit operations performed thereon in the production of flux materials by the improved process of the present invention. The traveling grate machine is here shown equipped for preheating draft gases, instead of direct exposure to ambient air.

Briefly stated, the present invention is in a process for manufacturing an iron-containing flux material for use in steel-making processes. This process comprises forming an intimate mixture of iron oxide, limestone, and carbon which materials have a particle size which can vary quite widely. Generally, the iron oxide material, in particular may be utilized as a sludge or slurry containing up to 50% or more solids, or it may be used as a dry powder. The limestone has a particle size generally designated as —¼", that is, the median particle size is such that it will pass through openings ¼" in diameter. The carbon-containing, or carbonaceous materials has a particle size about —⅛". These particulate materials of disparate particle sizes are admixed according to a general formula which provides from about 50% to about 80% limestone, from about 10% to about 48% iron oxide and from about 10% to about 20% carbon, these percentages being by weight. Under certain circumstances, previously prepared sintered product having a particle size of about —⅛" to —⅜" may be recycled, for example, poorly fired or underfired materials fines which are collected from the air streams or gas streams in the process may be recycled and thus reclaimed. Such returns in an amount up to 45% by weight on the dry basis may be used.

When these particulate materials have been admixed to form a dry mixture, or a moist mixture as the case may be, the mixture is either moistened with water, or the moisture content of the mixture is adjusted so as to be within the range of from about 7% to about 14% by weight of the dry mixture depending upon the requirements of the mixture under the conditions of agglomerating particles of random size. These agglomerates may be formed upon conventional agglomerating apparatus, such as, an inclined rotating pan. The mixture of raw ingredients is conveyed by suitable means such as a belt conveyor to the inclined rotating agglomerating pan where the material is further mixed and agglomerated into larger particles of irregular random size. Such particles may range in size from about .1″ to about .5″ in average diameter. The particles are not regular, but appear granular. The mass issuing from the agglomerating pan or apparatus is identified herein as "green" or moist agglomerate. The "green" agglomerate is charged to a traveling grate machine, for example, a conventional Dwight-Lloyd machine adapted for sintering to a depth of from about 6″ to 16″ to form a "green" agglomerate burden. Adaptation for sintering usually includes a gas torch for ignition of the bed. The processing time of the agglomerated composition of this process is from ½ to ¾ of that required for fuel-less compositions. Heat for the sintering operation is derived from the fuel content of the agglomerate and from exothermic reactions occurring within the bed. Auxiliary heat is not usually required, but may be supplied from gas torches disposed above the burden bed. In a sintering operation "soaking" of the burden at a given temperature, i.e., holding the temperature for completion of the reaction, is not necessary, since by the time the hot front or wave front has traversed the agglomerate bed, the reactions have essentially been completed. Conditions of sintering are severe in comparison with indurating processes where soaking is more likely to be employed.

Referring now more particularly to the attached flow sheet, limestone is transferred from a hopper to a grinder or pulverizer where it is reduced in size to the predetermined median size, otherwise designated as —¼″. From an intermediate storage point, the limestone is directed to a pug mill where it is intimately blended wth anthracite coal, or other solid carbonaceous material having a particle size of about —⅛″. The blend is also admixed with basic oxygen furnace fume in either the wet or dry state, the moistened form being preferred. If necessary, water is added to the mixture. In a preferred process, the mixture then passes through a shredder preliminary to the agglomerating operation. The agglomerated particles of random size are then transferred to the sintering machine, preferably a traveling grate machine of the Dwight-Lloyd type adapted for sintering, where they are subjected to substantially uncontrolled conditions of ignition and sintering, the only control being that the temperature is held below the point of incipient fusion of the mass, and the time of exposure to the elevated temperatures of sintering being sufficient to convert the carbon to carbon dioxide, the limestone to lime and the iron content to calcium ferrite.

As mentioned above, one method of abating iron oxide containing fumes in a steel-making operation involves a wet scrubbing technique. In such a system, the fumes evolved are passed through a venturi type scrubber to which a liquid such as water is added continuously. One advantage of a wet scrubbing system is that waste materials from most steel-making operations will contain a certain amount of zinc due to the addition of galvanized metal as a part of the scrap charged to the steel-making operation. Zinc is undesirable in a steel-making operation and, if present, it will be volatilized and leave the operation in the fume. Zinc also has a deleterious effect upon the refractory lining of steel-making furnaces. While it is desirable to remove as much of the zinc as possible at the time the fume from the steel-making process is passed through the scrubber, a certain amount of it will pass into the recovered fume particles of iron oxide and be carried into the sintering process. As above indicated, the present process is especially useful in promoting the removal of zinc by reduction to the metal and volatilization in the course of the sintering operation. About 50% to 75% of the zinc may thus be removed. The effluent from a wet scrubbing device may, if desired, be passed to a conventional thickener in order to reduce its water content.

While the present invention is in no way limited by the type of fume abatement device utilized in obtaining the particles of ferric oxide which form one of the raw materials of the process, the process will be described hereinafter in relation to the wet sludge obtained from a wet scrubbing system of the type described above merely for the sake of convenience.

Wet sludge of the type obtained in a wet scrubbing system may contain as much as 50% by weight solids after thickening. Such a sludge is liquid and it may be handled by pumping. If desired, the water content of this sludge may be further reduced by conventional means such as filtration or centrifugation to a minimum of about 12% water by weight. It should be emphasized, however, that sludge with a water content as high as 50% makes a suitable feed for the present process. The solid portion of the sludge will usually have a chemical composition within the ranges given in the following table:

*Table 1*

| Component: | Percent by weight |
|---|---|
| $Fe_2O_3$ | 60–95 |
| $Mn_2O_3$ | 4–10 |
| $Al_2O_3$ | 1–5 |
| $SiO_2$ | 2–5 |
| CaO | 4–10 |
| MgO | 2–4 |

The dust may also contain minor amounts of phosphorus, sulphur, and zinc. In general, the loss on ignition of the dust will be less than 5%. The average particle size of the solid material will be below about 5 microns in diameter, usually of the order of about 1 micron.

Commercial metallurgical grade limestone having a particle size range of about ¾″ to about ¼″, makes suitable raw material for this process. However, before mixing it with the iron oxide, it should be reduced in size to a point where at least 50% thereof is —¼″ and, as above indicated, this size reduction may be conveniently accomplished in a grinder or pulverizer.

After being reduced in size, the limestone is transferred to a conventional mixing device such as a pug mill where it is mixed with the wet sludge described above. Concurrently there is admixed with the mixture a carbonaceous fuel material to the extent of about 10% to about 20% by weight on the dry basis. The resulting mixture, calculated on the dry basis, may contain from about 50% to about 80% limestone, from about 10% to about 48% by weight of iron oxide, and from about 10% to about 20% by weight of carbon. This mixture is transferred to a conventional balling apparatus in which the moist mixture of limestone, ferric oxide and carbonaceous fuel is formed into so-called "green" agglomerates which are ordinarily of random size and have an average diameter spanning the range of from about 0.1″ to about 0.5″.

One suitable balling apparatus consists of a pan which is open at its upper end and mounted so as to be inclined from the vertical towards its open end. Means are provided to rotate the pan at a relatively fast peripheral speed. Water may be sprayed into the pan at its open end, if desired, to assist in the balling operation. As the pan is rotated, the mixture of limestone, ferric oxide, and carbon will agglomerate into random size particles which roll over and over upon the remaining materials so as to gradually increase in size. When the agglomerate attains sufficient size they will through the crowding effect of incoming material roll out of the open end of the pan. These so-called "green" agglomerates are collected and conveyed to a conventional traveling grate machine.

Traveling grate machines of the Dwight-Lloyd type are widely employed in the metallurgical art and the principles of their operation are well understood. In general, such machines comprise a grate made up of a plurality of individual pallets or grates. This traveling grate is power driven and passes continuously past a gas torch, or through an enclosed chamber which is equipped with gas torches and gas confining hoods, generally located above the grate, and gas exhausting means, including windboxes and fan means to insure the flow of gas through the enclosed chamber. Means, such as a plurality of gas burners, are provided for supplying heat to the burden on the grates as it passes through the chamber. When adapted for sintering, the balance of the machine is usually exposed to ambient air above and one or more windboxes below the bed. The machine may, if desired, include conventional means for recovering and recirculating the exhaust gases through the bed. It is frequently desirable to conserve heat by passing the incoming air in heat exchange relation with spent hot gases issuing from the burden to raise the inlet air temperature to about 600° F. or more. Generally, a single pass of the gases through the bed is desirable where the agglomerate contains significant amounts of zinc, since this deleterious material is thus removed as a vapor rather than concentrated in recirculating gases. In operation, the charge to the machine is distributed evenly on the grates to a depth of from about 6" to about 16", preferably about 12" to 15". The sintered material emerging from the machine will fall from the pallets as they begin their return trip to the entrance of the machine.

In the traveling grate machine the green agglomerates are first ignited, preferably by direct impingement of a flame from a gas torch directed on the upper surface of the burden layer. Because the particle size of the carbon and the limestone is large, and the iron oxide is reacted with the lime to form calcium ferrite, the production of fines is not a serious problem with this material. Hence, rapid expulsion of water from the agglomerate may be tolerated. During the next step in the sintering process, the temperature is raised to a maximum of about 2100°, but not higher than the point of incipient fusion of the agglomerates, i.e. soft, but not molten. It is usually unnecessary to go much above 2400° F. bed temperature and this temperature need only be maintained for a period of from 5 minutes to 15 minutes.

The agglomerates form a sinter cake which may be easily broken into conveniently handled lumps, e.g. 4". The composition of the agglomerates has been found by this process to convert from a simple mixture of iron oxide, carbon and limestone into an intimately bonded mixture of lime and calcium ferrites. This sinter may be charged directly into a basic oxygen furnace where it serves as a fluxing material for the removal of pig iron impurities, or cooled and stored for such subsequent use.

It is postulated that the following chemical reactions may occur in the traveling grate machine:

$$CaCO_3 \rightarrow CaO + CO_2$$
$$2CaO + Fe_2O_3 \rightarrow 2CaO \cdot Fe_2O_3$$
$$CaO + Fe_2O_3 \rightarrow CaO \cdot Fe_2O_3$$
$$4CaO + FeO + 4Fe_2O_3 \rightarrow 4CaO \cdot FeO \cdot 4Fe_2O_3$$
$$CaO + FeO + Fe_2O_3 \rightarrow CaO \cdot FeO \cdot Fe_2O_3$$
$$CaO + 2Fe_2O_3 \rightarrow CaO \cdot Fe_2O_3$$
$$3CaO + FeO + 7Fe_2O_3 \rightarrow 3CaO \cdot FeO \cdot 7Fe_2O_3$$
$$CaO + 3FeO + Fe_2O_3 \rightarrow CaO \cdot 3FeO \cdot Fe_2O_3$$

It will be appreciated that the exact reactions which occur within the sintering process cannot be established with certainty, and, accordingly, the reactions are to be considered merely as illustrative and not as limiting this invention in any manner.

It becomes convenient at this point to illustrate the foregoing process by giving specific examples setting forth the compositions of the green mix, and the conditions of agglomerating and conversion of the "green" agglomerates to a flux material useful in a steel making process as above described.

RESULTS OF SINTERING TESTS—BASIC OXYGEN FURNACE DUST AND LIMESTONE

| Test No. | 1 | 2 |
|---|---|---|
| Charge data: | | |
| Burden composition: | | |
| Basic oxygen furnace dust, percent | 13.8 | 13.8 |
| Limestone, −¼ inch, percent | 55.1 | 55.1 |
| Coke breeze, −10 mesh, percent | 13.8 | 13.8 |
| Returns, percent | 17.3 | 17.3 |
| Structure of blend | Nodular | Nodular |
| Charge weight, lbs | 75 | 75 |
| Moisture content, percent | 13.5 | 13.5 |
| Bed depth, inches | 10 | 10 |
| Processing conditions: | | |
| Ignition: | | |
| Time, sec | 90 | 90 |
| Draft flow, s.c.f.m./ft.² | 300 | 300 |
| Intensity | Strong | Strong |
| Sintering: | | |
| Time, min | 5.5 | 5.5 |
| Draft flow, s.c.f.m./ft.² | 300 | 300 |
| Vacuum, inches of H₂O | 18.4 | 19.5 |
| Total processing time, min | 7 | 7 |
| Product data: | | |
| Discharge weight, lbs | | 42.6 |
| Capacity, NT/ft.²/day | | 3.4 |
| −4 inches 3 inches, percent | | 13.4 |
| 2 inches, percent | | 13.9 |
| Structure of −4 inches product: | | |
| 1 inch, percent | | 29.9 |
| ¾ inch, percent | | 10.4 |
| ⅝ inch, percent | | 5.1 |
| ½ inch, percent | | 4.6 |
| ⅜ inch, percent | | 4.3 |
| ¼ inch, percent | | 6.1 |
| ⅛ inch, percent | | 8.2 |
| −⅛ inch, percent | | 4.1 |
| Tumble test, −20 lobs., −28 M percent | | 3.30 |
| Chemistry: | | |
| Fe_t, percent | | 20.7 |
| Fe_m, percent | | 8.7 |
| LOI, percent | | ¹1.1 |

¹ Gain.

These agglomerates are suitable for use as an iron bearing flux in steel-making operations and they may be charged to a steel-making operation. The need for lime which is inherent in any steel-making operation will be reduced by the amount of lime in the agglomerates and, moreover, the iron value of the dust collected in fume abatement devices may be recovered as steel.

It will be apparent from the foregoing description and examples that the process of the present invention makes it possible to recover more economically and efficiently the iron values from the material collected in fume abatement devices. The process is also an improvement over prior ferruginous lime processes in that the capacity of the sintering machine apparatus, the zinc removal feature, and the reduced heat requirements provide a better and more economical fluxing material.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for making an iron-containing flux material for steel-making processes comprising the steps of:
    (a) intimately mixing materials having predetermined average particle sizes and in accordance with the general formulation:
        (1) minus ¼" limestone—from about 50% to about 80% by weight,
        (2) minus 100 mesh iron oxide—from about 10% to about 48% by weight,
        (3) minus ⅛" carbon—from about 10% to about 20% by weight,
    (b) moistening said dry mixture with water,
    (c) nodularizing said moistened mixture to form aggregate irregular green particles of random sizes ranging from about −0.1" to about 0.5", (d) charging said irregular green particles to a traveling grate sintering machine to a depth of from about 6″ to 16″ to form a burden,
(e) igniting said burden with an open gas flame, and
(f) sintering said burden at a temperature of at least about 2100° F. for a period of from about 5 minutes to about 20 minutes by passing air through said burden at a rate of from about 200 s.c.f.m./sq. ft. to about 325 s.c.f.m./sq. ft.

2. The process of claim 1 in which the air passed through the burden is ambient air.

3. The process of claim 1 in which the air is preheated by being passed in heat exchange relation with exhaust gases exiting from the sinter bed.

4. The process of claim 1 in which the iron oxide is ferric oxide derived from a steel-making operation.

5. The process of claim 4 in which the ferric oxide is derived from a basic oxygen furnace.

6. A process for making an iron-containing flux material for steel-making processes comprising the steps of:
   (a) intimately mixing materials having predetermined average particle sizes and in accordance with the general formulation:
      (1) minus ¼″ limestone—from about 50% to about 80% by weight,
      (2) minus 100 mesh iron oxide—from about 10% to about 48% by weight,
      (3) minus ⅛″ carbon—from about 10% to about 20% by weight,
      (4) minus ⅜″ recycled sintered flux material—from about 1% to about 45% by weight,
   (b) moistening said mixture with water,
   (c) nodularizing said moistened mixture to form aggregate irregular green particles of random sizes ranging from about −0.01″ to about 0.4″,
   (d) charging said irregular green particles to a traveling grate sintering machine to a depth of from about 6″ to 16″ to form a burden,
   (e) igniting said burden with an open gas flame, and
   (f) sintering said burden at a temperature of at least about 2100° F. for a period of from about 5 minutes to about 10 minutes by passing air through said burden at a rate of from about 175 s.c.f.m./sq. ft. to about 275 s.c.f.m./sq. ft.

7. The process of claim 6 in which the air is ambient air.

8. The process of claim 6 in which the air is preheated by passing in heat exchange relation with exhaust gases exiting from the sinter bed.

References Cited by the Examiner
UNITED STATES PATENTS

| | | | |
|---|---|---|---|
| 765,789 | 7/1904 | Peppel | 75—3 |
| 1,267,686 | 5/1918 | Newberry | 75—55 |
| 2,159,977 | 5/1939 | Nicholas | 75—54 |
| 2,750,273 | 6/1956 | Lellep | 75—3 |
| 2,990,268 | 6/1961 | De Vaney | 75—5 |
| 3,083,090 | 3/1963 | Davies | 75—5 |
| 3,180,723 | 4/1965 | McCauley | 75—3 |

BENJAMIN HENKIN, *Primary Examiner.*